(12) United States Patent
Chen

(10) Patent No.: US 6,344,643 B1
(45) Date of Patent: Feb. 5, 2002

(54) ENCODER WHEEL MODULE AND CIRCUIT BOARD ARRANGEMENT FOR AN OPTICAL MOUSE WITH SCROLLING FUNCTION

(75) Inventor: Cheng Hsiung Chen, Taipei (TW)

(73) Assignee: Dexin Corporation, Taipei Hsien (TW)

( * ) Notice: Subject to any disclaimer, the term of this patent is extended or adjusted under 35 U.S.C. 154(b) by 0 days.

(21) Appl. No.: 09/421,565

(22) Filed: Oct. 20, 1999

(51) Int. Cl.[7] ............................. G09G 5/00; G09G 5/09
(52) U.S. Cl. .................. 250/221; 250/231.14; 345/158; 345/165; 345/184
(58) Field of Search ..................... 250/221, 222.1, 250/231.13, 231.14, 231.15, 231.16; 345/123, 156, 157, 158, 163, 164, 165, 166, 167, 168, 169, 184; 341/31, 34, 35

(56) References Cited

U.S. PATENT DOCUMENTS

| | | | | |
|---|---|---|---|---|
| 5,530,455 A | * | 6/1996 | Gillick et al. | 345/163 |
| 5,952,997 A | * | 9/1999 | Hu | 345/163 |
| 6,014,130 A | * | 1/2000 | Yung-Chou | 345/163 |
| 6,097,371 A | * | 8/2000 | Siddiqui et al. | 345/164 |
| 6,137,477 A | * | 10/2000 | Hu | 345/163 |
| 6,157,369 A | * | 12/2000 | Merminod et al. | 345/157 |
| 6,188,393 B1 | * | 2/2001 | Shu | 345/184 |

* cited by examiner

Primary Examiner—John R. Lee
(74) Attorney, Agent, or Firm—Rosenberg, Klein & Lee

(57) ABSTRACT

An encoder wheel module and circuit board arrangement for an optical mouse with scrolling function, which includes a circuit board having a microswitch, a mount mounted on the circuit board, the mount having an integrally-formed bottom frame, an integrally-formed suspension arm spaced above the bottom frame, and an integrally-formed connecting portion connected between the bottom frame and the suspension arm at a rear side, the suspension arm having a front tongue suspending above the microswitch, an optical encoder wheel supported on the suspension arm, a transmitter mounted on the mount at one side and controlled by the circuit board to emit a light beam through radial slots at the optical encoder wheel, and an optical detector mounted on the mount at one side opposite to the transmitter and controlled by the circuit board to read the light beam transmitted by the transmitter, wherein the optical encoder wheel not only provides scrolling up and scrolling down functions when rotating the encoder wheel, but also provides third button functions when depressing the encoder wheel. Depressing the encoder wheel consequently forces the suspension arm and its front tongue down to activate the third button switch to perform special mouse operations.

9 Claims, 7 Drawing Sheets

ENCODER WHEEL MODULE AND CIRCUIT BOARD ARRANGEMENT FOR AN OPTICAL MOUSE WITH SCROLLING FUNCTION

BACKGROUND OF THE INVENTION

The present invention relates to an optical mouse with scrolling function, and more particularly to an encoder wheel module and circuit board arrangement for an optical mouse.

FIGS. from 1 through 3 show an encoder wheel module and circuit board arrangement for use in an optical mouse with scrolling function. This structure of encoder wheel module and circuit board arrangement comprises a circuit board 1 having a microswitch 24, a mount 2 mounted on the circuit board 1, the mount 2 comprising two side blocks 20 at two opposite lateral sides and a wheel holder 21 raised from one side block 20, an optical encoder wheel 3 revolvably supported on the wheel holder 21 between the side blocks 20, a transmitter 22 mounted in one of the side blocks 20 and controlled by the microswitch 24 at the circuit board 1 to emit a light beam through radial slots at the optical encoder wheel 3, an optical detector 23 mounted in the other of the side blocks 20 and controlled by the microswitch 24 at the circuit board 1 to read the light beam transmitted by the transmitter 22 and to output a signal indicative of the direction and amount of rotation of the optical encoder wheel 3, and a linking mechanism 4 mounted on the mount 2 and moved with the optical encoder wheel 3 to trigger the microswitch 24 at the circuit board 1. The linking mechanism 4 is comprised of a first pressure plate 40, a second pressure plate 41, and a spring member 42. The first pressure plate 40 and the second pressure plate 41 each has a crossed profile. The first pressure plate 40 comprises a front endpiece 400 inserted into a recessed hole 210 at the wheel holder 21, two side wings 401 respectively supported on blocks 211 at two sides of the recessed hole 210, and a rear endpiece 402 connected to one end of the spring member 42. The second pressure plate 41 comprises a front endpiece 410 extended through two projecting stop wall portions 200 at one side block 20 and suspending above the microswitch 24, two side wings 411 stopped below the projecting stop wall portions 200, and a rear endpiece 412 connected to one end of the spring member 42 opposite to the rear endpiece 402 of the first pressure plate 400. When the optical encoder wheel 3 is depressed as shown in FIG. 4, the first pressure plate 40 is forced by the optical encoder wheel 3 to turn the second pressure plate 41, thereby causing the front endpiece 410 of the second pressure plate 41 to trigger the microswitch 24. This arrangement is still not satisfactory in function. The use of the linking mechanism 4 complicates the structure of the encoder wheel module and circuit board arrangement, and greatly increases its manufacturing cost. Installing the linking mechanism 4 is also not an easy job. Because the pressure plates 40 and 41 and the spring member 42 are tiny, it is difficult to accurately install the pressure plates 40 and 41 and the spring member 42 in position. During installation, the spring member 42 may be forced to jump away, or to push the second pressure plate 41 out of place. In order to hold the linking mechanism 4, the design of the mount 2 is complicated.

SUMMARY OF THE INVENTION

The present invention has been accomplished to provide an encoder wheel module and circuit board arrangement for an optical mouse, which eliminates the aforesaid drawbacks. It is one object of the present invention to provide an encoder wheel module and circuit board arrangement, which has a simple structural design. It is another object of the present invention to provide an encoder wheel module and circuit board arrangement, which is inexpensive to manufacture. According to one aspect of the present invention, the encoder wheel module and circuit board arrangement comprises a circuit board having a microswitch as the third button switch, a mount mounted on the circuit board, the mount having an integrally-formed bottom frame, an integrally-formed suspension arm spaced above the bottom frame, and an integrally-formed connecting portion connected between the bottom frame and the suspension arm at a rear side, the suspension arm having a front tongue suspending above the microswitch, an optical encoder wheel supported on the suspension arm, a transmitter mounted on the mount at one side and controlled by the circuit board to emit a light beam through radial slots at the optical encoder wheel, and an optical detector mounted on the mount at one side opposite to the transmitter and controlled by the circuit board to read the light beam transmitted by the transmitter, wherein when the optical encoder wheel is depressed, the microswitch is triggered by the front tongue of the suspension arm to accomplish third button activation. According to another aspect of the present invention, the suspension arm comprises two upright support plates disposed at two opposite sides for supporting the optical encoder wheel, the upright support plates each comprising a top V-cut and a recessed portion in the top V-cut for supporting wheel axle means of the optical encoder wheel. According to still another aspect of the present invention, the optical encoder wheel comprises a toothed disk portion at one side thereof, and the suspension arm of the mount comprises a spring plate pressed on the toothed disk portion at the optical encoder wheel to guide rotary motion of the optical encoder wheel step by step. According to still another aspect of the present invention, the suspension arm of the mount comprises two wings at two opposite sides for supporting the transmitter and the optical detector, the wings each having a plurality of through holes through which respective contact pins of the transmitter or the optical detector are extended and connected to the circuit board.

DETAILED DESCRIPTION OF THE PREFERRED EMBODIMENT

Figure 1:
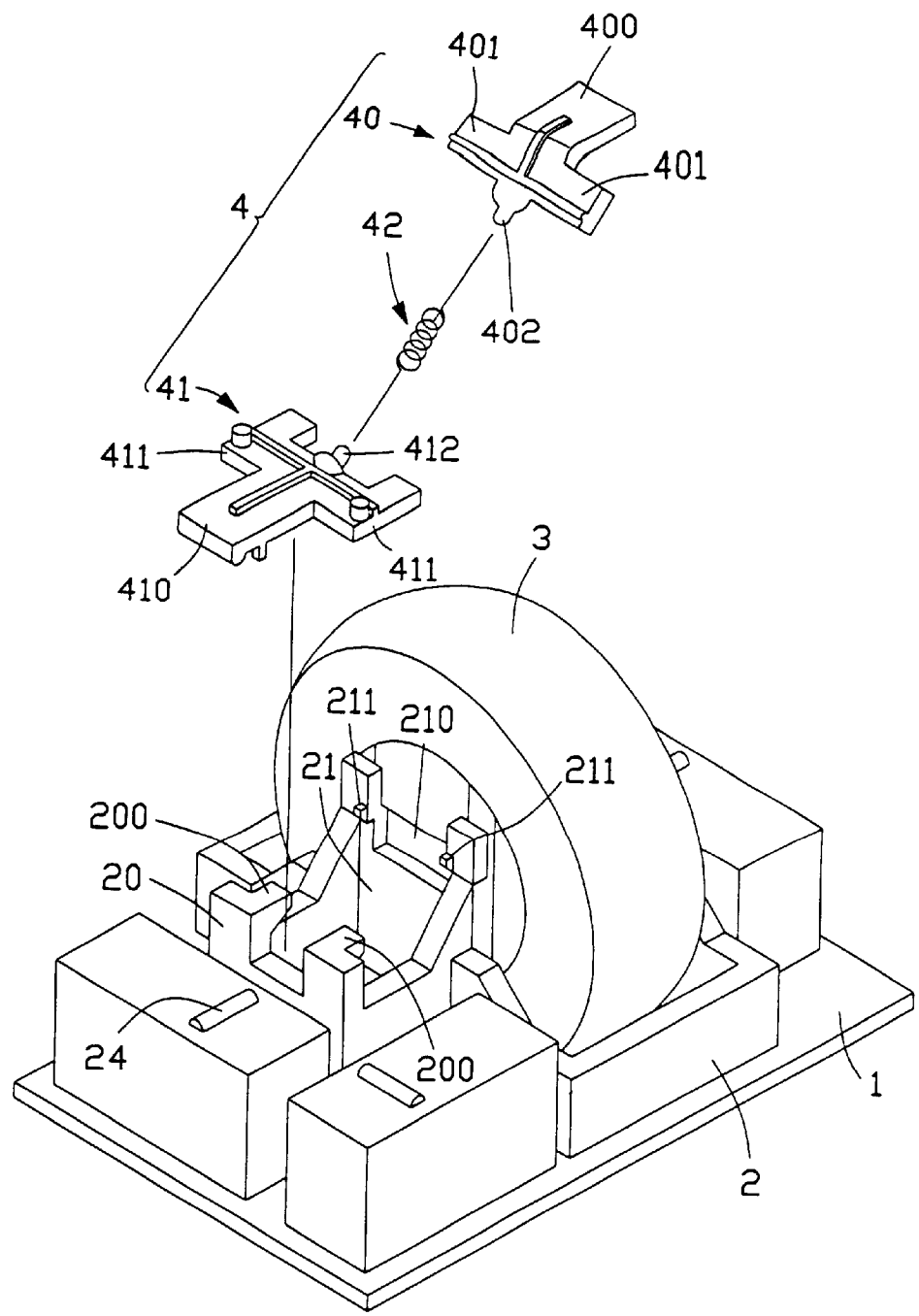
FIG. 1 is an exploded view of an encoder wheel module and circuit board arrangement for an optical mouse according to the prior art.
Figure 2:
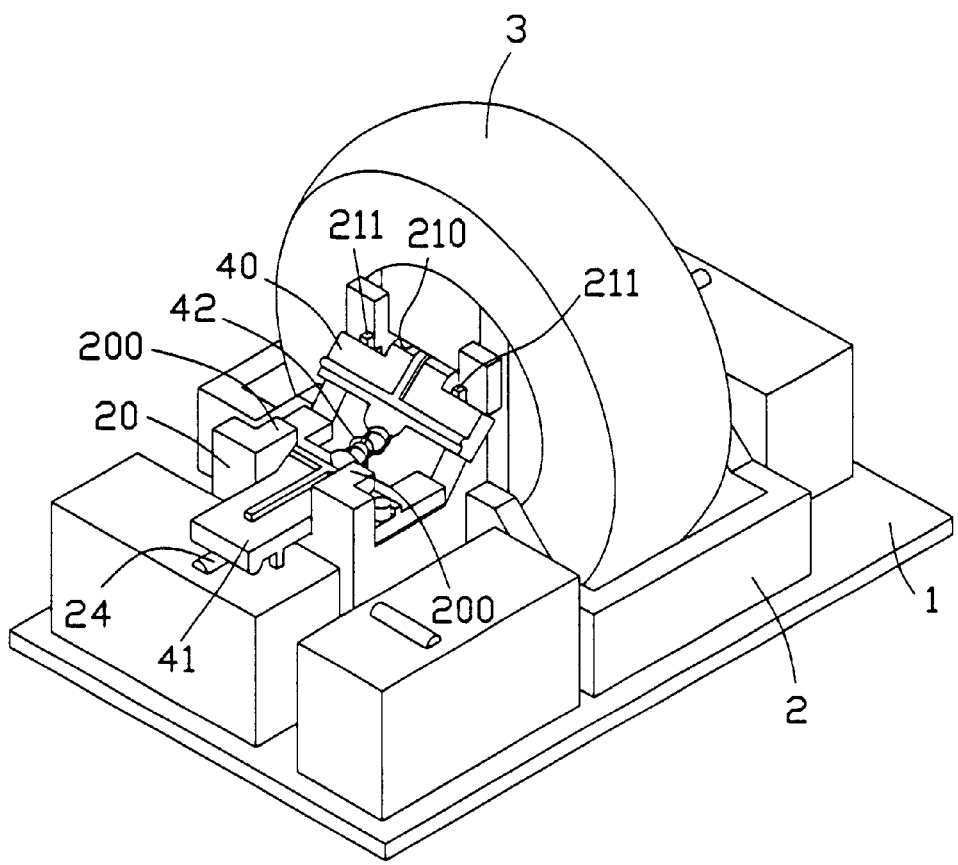
FIG. 2 is an assembly view of FIG. 1.
Figure 3:
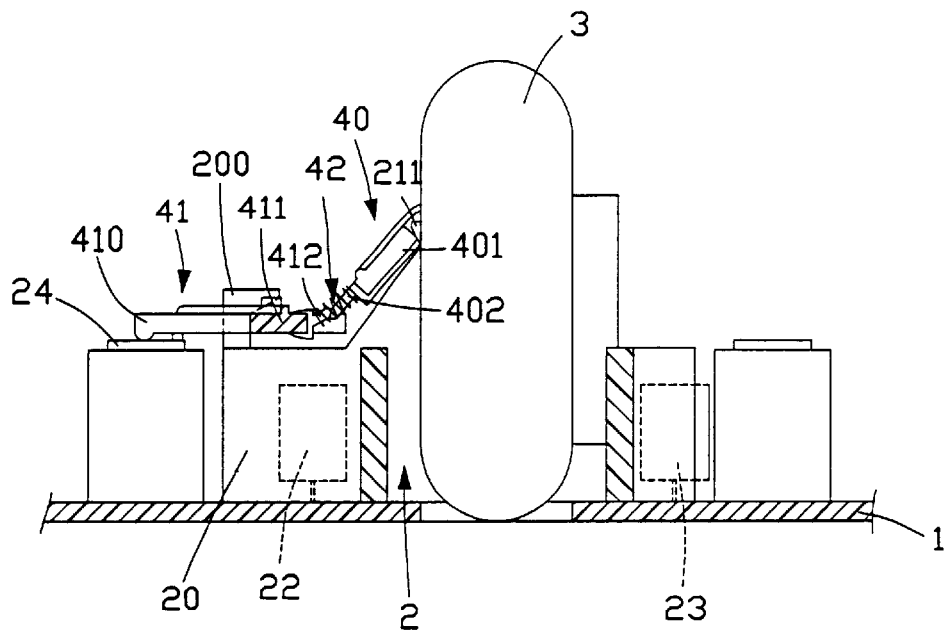
FIG. 3 is a front plain view of FIG. 2 showing the optical encoder wheel not operated.
Figure 4:
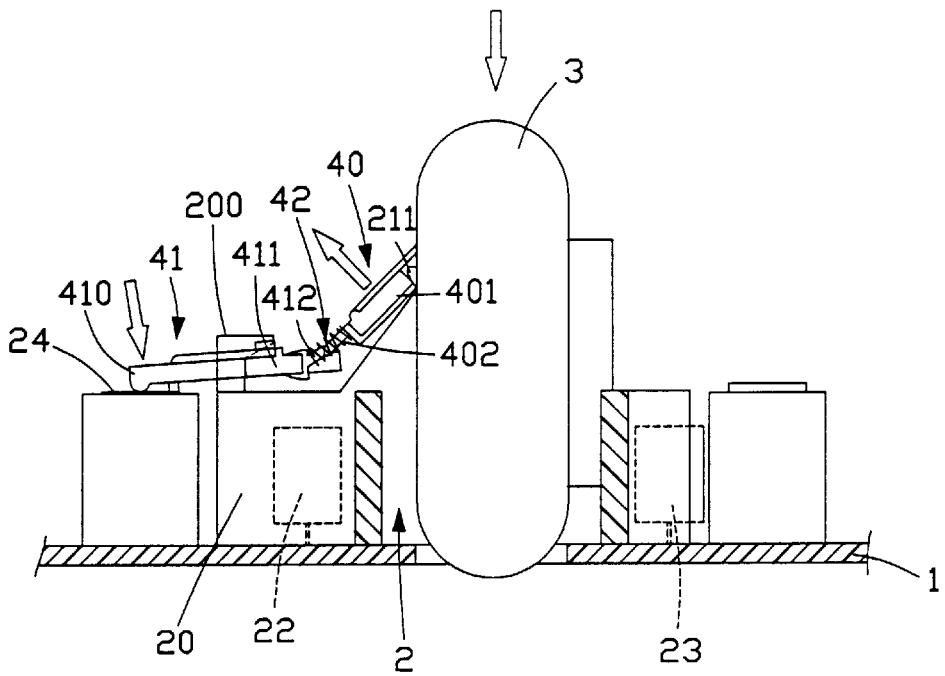
FIG. 4 is similar to FIG. 3 but showing the optical encoder wheel depressed.
Figure 5:
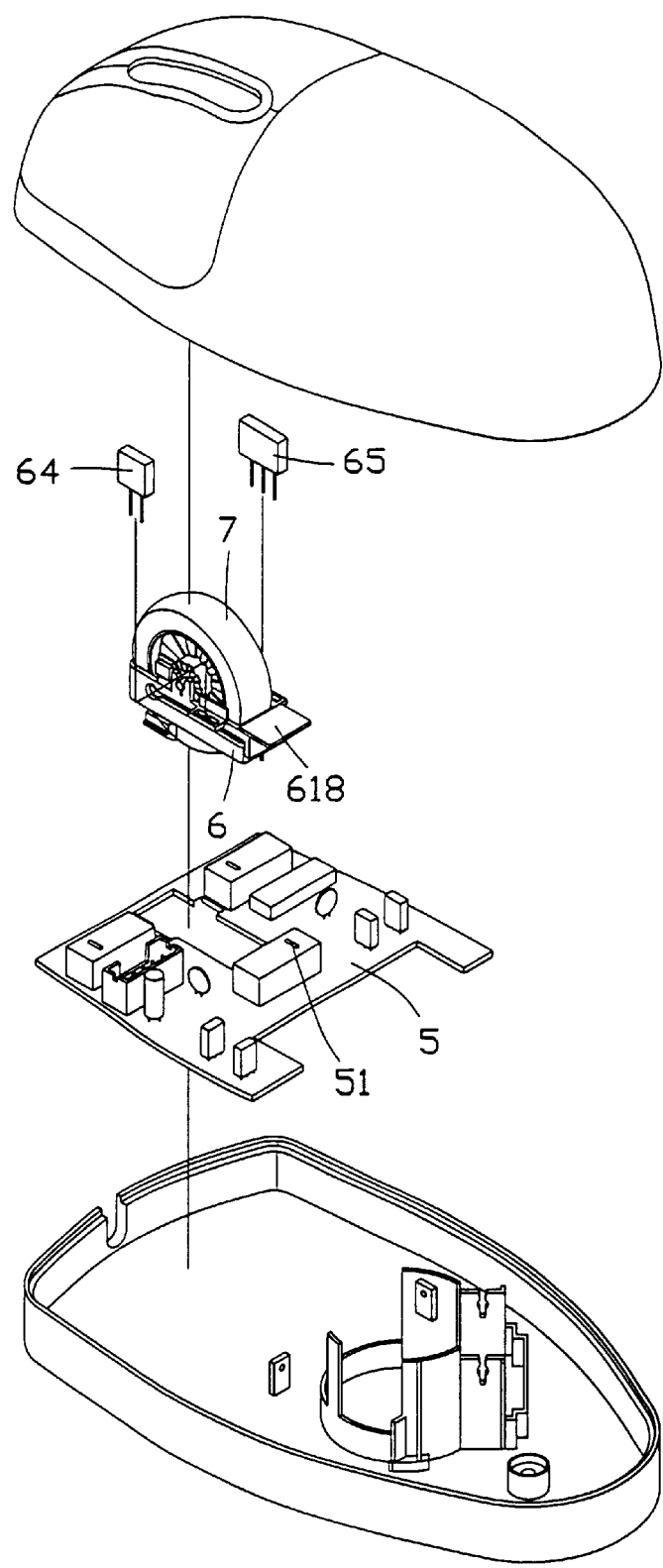
FIG. 5 is an exploded view of an optical mouse constructed according to the present invention.
Figure 6:
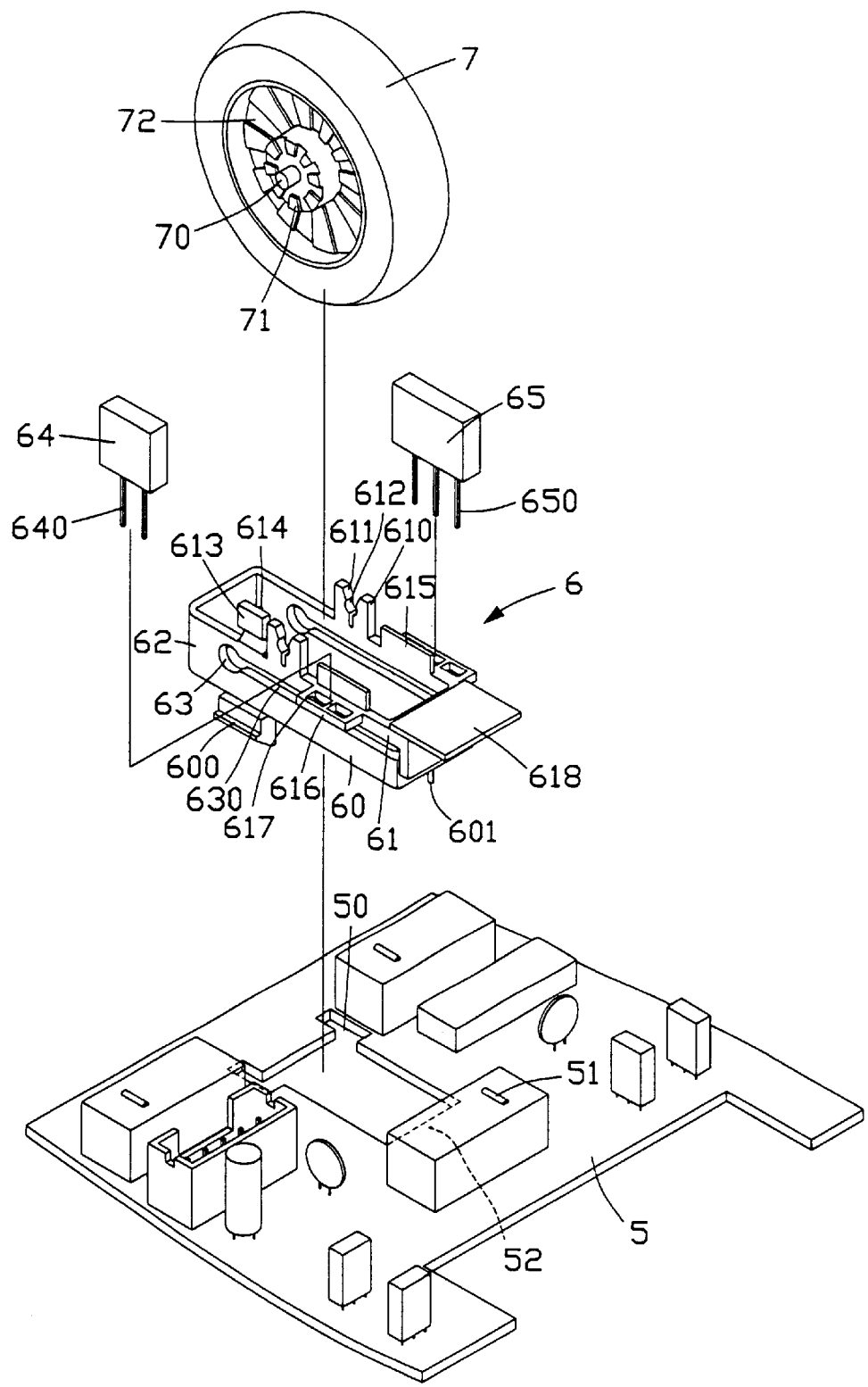
FIG. 6 is an exploded view of an encoder wheel module and circuit board arrangement according to the present invention.
Figure 7:
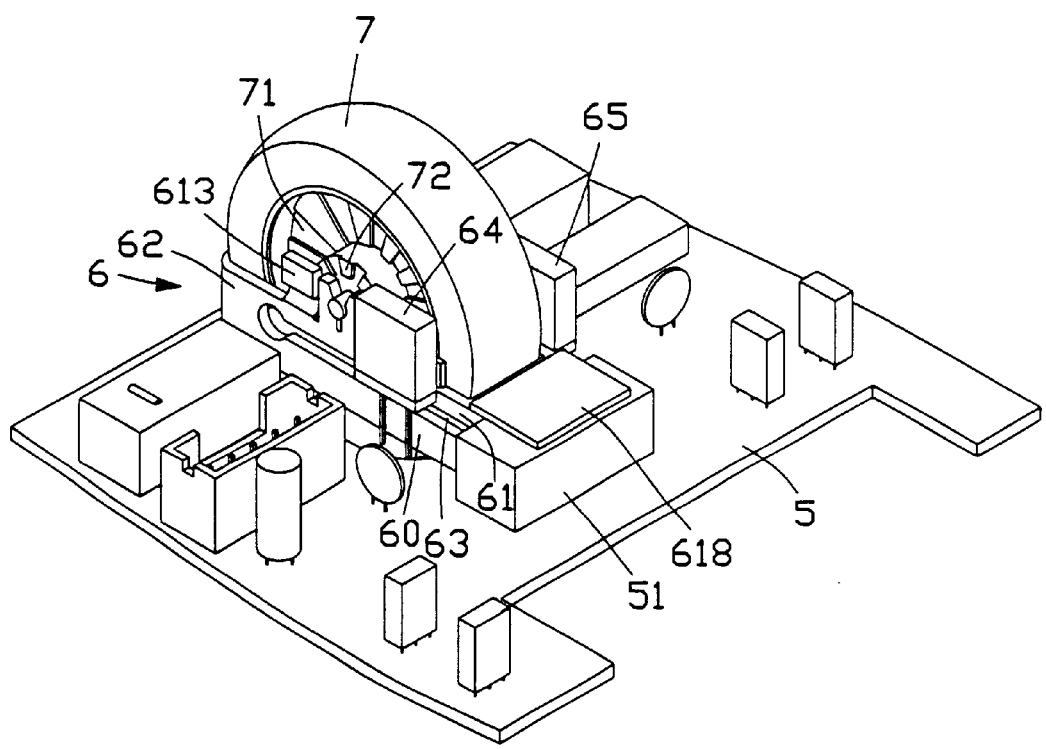
FIG. 7 is an assembly view of FIG. 6.

Referring to FIGS. from 5 through 7, an encoder wheel module is shown mounted on a circuit board 5 for use in an optical mouse, comprised of a mount 6, an optical encoder wheel 7, a transmitter 64, and an optical detector 65.

Figure 8:
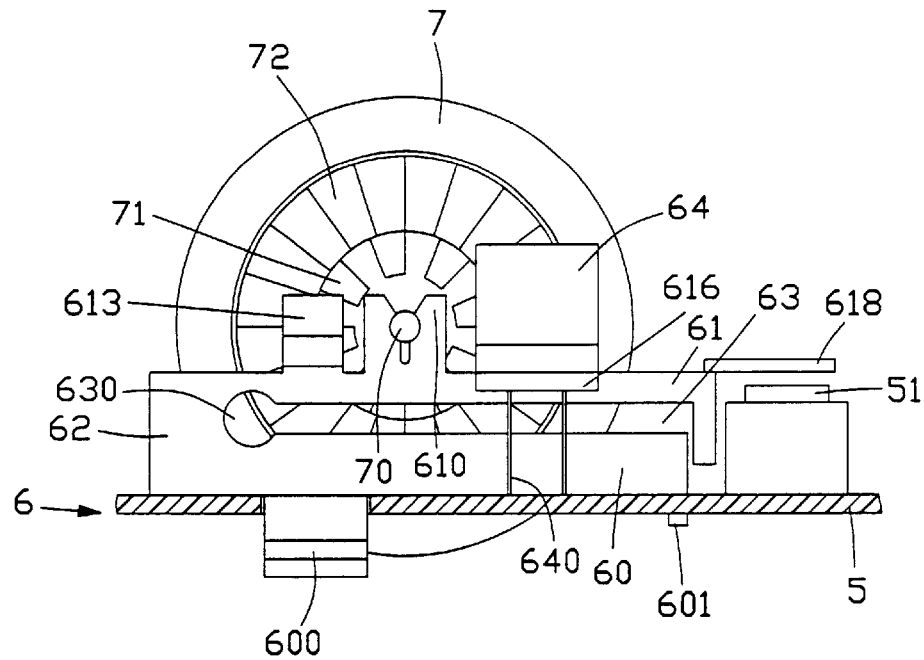
FIG. 8 is a side plain view of FIG. 7 showing the optical encoder wheel not operated.

The mount 6 is a hollow, substantially rectangular shell molded from plastic, comprising a bottom frame 60, a horizontally forwardly extended suspension arm 61, and a connecting portion 62 connected between the bottom frame 60 and the suspension arm 61 at the back side. The suspension arm 61 is forwardly extended from the connecting portion 62, and spaced above the bottom frame 60 by a horizontally extended narrow gap 63 and an expanded opening 630 at one end of the gap 63 at the connecting area between the suspension arm 61 and the bottom frame 60. The bottom frame 60 comprises two downward hooks 600 downwardly and bilaterally extended from its bottom side wall near the rear side and respectively hooked in respective locating notches 50 at the circuit board 5, and a downward positioning rod 601 downwardly extended from its bottom side wall on the middle near the front side and plugged into a locating hole 52 at the circuit board 5. The suspension arm 61 comprises two upright support plates 610 symmetrically disposed at two opposite sides on the middle for supporting the optical encoder wheel 7, and a spring plate 613 adjacent to one upright support plate 613 for holding the optical encoder wheel 7 in place. The upright support plates 610 each have a V-cut 611, and a recessed portion 612 in the V-cut 611. The spring plate 613 has a fixed end formed integrally with the suspension arm 61, and a free end terminated at a flanged portion 614. The optical encoder wheel 7 is supported on the suspension arm 61 between the upright support plates 610, comprising a fixed wheel axle 70 at the center which is supported in the recessed portion 612 at each upright support plate 610, a toothed disk portion 71 disposed around the fixed wheel axle 70 at one side and stopped at the flanged portion 614 of the spring plate 613 for enabling the optical encoder wheel 7 to be rotated step by step, and radial slots 72 equiangularly spaced around the toothed disk portion 71. The suspension arm 61 further comprises two upright locating plates 615 disposed at two opposite sides in front of the upright support plates 610, and two horizontally outwardly extended wings 616 disposed at two opposite sides corresponding to the upright locating plates 615, and a front tongue 618 forwardly extended from its front side above a microswitch 51 at the circuit board 5 (see FIG. 8). The wings 616 each have a plurality of through holes 617. The transmitter 64 and the optical detector 65 are respectively mounted on the wings 616 and stopped at the locating plates 615. After installation, the respective contact pins 640; 650 of the transmitter 64 and the optical detector 65 are respectively inserted through the through holes 617 at the wings 616, and welded to respective contacts at the circuit board 5.

Figure 9:
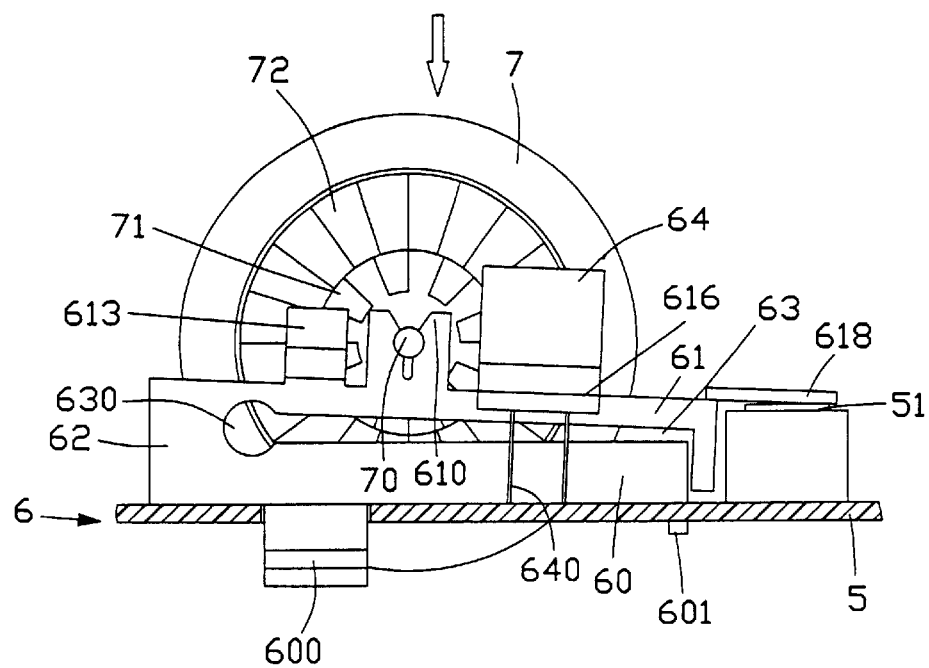
FIG. 9 is similar to FIG. 8 but showing the optical encoder wheel depressed.

Referring to FIG. 9, when the operator presses the optical encoder wheel 7 downwards, the suspension arm 61 of the mount 6 is forced to lower the front tongue 618 into contact with the microswitch 51 at the circuit board 5, thereby activating the third button's function predefined by the installed software driver.

While only one embodiment of the present invention has been shown and described, it will be understood that various modifications and changes could be made thereunto without departing from the spirit and scope of the invention disclosed.

What the invention claimed is:

1. An encoder wheel module and circuit board arrangement for an optical mouse with scrolling function, comprising:
    a circuit board having a microswitch known as a third button switch for special mouse operations;
    a mount mounted on said circuit board adjacent to said microswitch, said mount comprising a bottom frame, a suspension arm spaced above said bottom frame, a connecting portion connected between said bottom frame and said suspension arm at a rear side remote from said microswitch, and a narrow, forwardly extended gap defined between said bottom frame and said suspension arm in front of said connecting portion, said suspension arm having a front tongue suspending above said microswitch for triggering said microswitch;
    an optical encoder wheel supported on said suspension arm, said optical encoder wheel having a plurality of equiangularly spaced radial slots;
    a transmitter mounted on said mount at one side and connected to said circuit board and controlled by said circuit board to emit a light beam through the radial slots at said optical encoder wheel; and
    an optical detector mounted on said mount at one side opposite to said transmitter and connected to said circuit board and controlled by said circuit board to read the light beam transmitted by said transmitter;
    wherein said mount is made in integrity, such that when said optical encoder wheel is depressed, said microswitch is triggered by the front tongue of said suspension arm to accomplish third button activation so as to perform the predefined function.

2. The encoder wheel module and circuit board arrangement of claim 1 wherein said suspension arm comprises two upright support plates disposed at two opposite sides for supporting said optical encoder wheel, said upright support plates each comprising a top V-cut and a recessed portion in said top V-cut for supporting wheel axle means of said optical encoder wheel.

3. The encoder wheel module and circuit board arrangement of claim 1 wherein said optical encoder wheel comprises at least one toothed disk portion at at least one of two opposite sides thereof, and said suspension arm of said mount comprises at least one spring plate respectively pressed on said at least one toothed disk portion at said optical encoder wheel to guide rotary motion of said optical encoder wheel step by step, said at least one spring plate each having a free end terminating in a flanged portion disposed on contact with one of said at least one toothed disk portion.

4. The encoder wheel module and circuit board arrangement of claim 1 wherein said suspension arm of said mount comprises two wings at two opposite sides for supporting said transmitter and said optical detector, said wings each having a plurality of through holes through which respective contact pins of said transmitter or said optical detector are extended and connected to said circuit board.

5. The encoder wheel module and circuit board arrangement of claim 4 wherein said suspension arm of said mount further comprises two upright locating plates disposed at two opposite sides corresponding to said wings for supporting said transmitter and said optical detector in position.

6. The encoder wheel module and circuit board arrangement of claim 1 wherein said circuit board comprises two locating notches, and said mount comprises two downward hooks downwardly and bilaterally extended from a bottom side wall thereof and respectively hooked in the locating notches at said circuit board.

7. The encoder wheel module and circuit board arrangement of claim 6 wherein said circuit board further comprises a locating hole for the positioning of said mount, and said mount further comprises a downward positioning rod downwardly extended from the bottom side wall thereof on the middle and plugged into the locating hole at said circuit board.

8. The encoder wheel module and circuit board arrangement of claim 1 wherein said narrow, forwardly extended gap has an expanded portion at a rear end adjacent to said connecting portion between said bottom frame and said suspension arm.

9. The encoder wheel module and circuit board arrangement of claim 1 wherein said front tongue can be arranged anywhere on said suspension arm according to the location of said microswitch on the circuit board.

* * * * *